Aug. 14, 1945.  H. H. LAMAR  2,382,235
VALVE STRUCTURE
Filed Aug. 12, 1943   2 Sheets-Sheet 1

INVENTOR
Harry H. Lamar.
BY
Ezra W. Savage
ATTORNEY

Aug. 14, 1945.         H. H. LAMAR         2,382,235
                    VALVE STRUCTURE
              Filed Aug. 12, 1943         2 Sheets-Sheet 2

INVENTOR
Harry H. Lamar.
BY
Ezra W. Savage
ATTORNEY

Patented Aug. 14, 1945

2,382,235

UNITED STATES PATENT OFFICE 2,382,235

VALVE STRUCTURE

Harry H. Lamar, Wilkinsburg, Pa.

Application August 12, 1943, Serial No. 498,315

10 Claims. (Cl. 251—31)

The invention relates generally to valves, and more particularly to diaphragm valves.

In the operation of most of the well known diaphragm packless valves, whether used as line valves or cylinder valves, considerable trouble is experienced because the valve will not always open under pressure. When these valves will not operate, the services of an expert is usually required. This raises a demand for a valve that can be used universally and which will operate under all pressure conditions.

The object of the present invention is to provide for utilizing the pressure of the fluid being controlled to cooperate in operating the valve head to facilitate the opening of the valve under all pressure conditions.

Other objects of the invention will, in part, be obvious, and, in part, will appear hereinafter.

The invention accordingly is disclosed in the embodiment thereof shown in the accompanying drawings and comprises the features of construction, combination of elements and arrangement of parts which will be exemplified in the construction hereinafter set forth and the scope of the application of which will be indicated in the claims.

For a general understanding of the nature and objects of the invention, reference should be had to the following detailed description taken in conjunction with the accompanying drawings in which.

Figure 1:
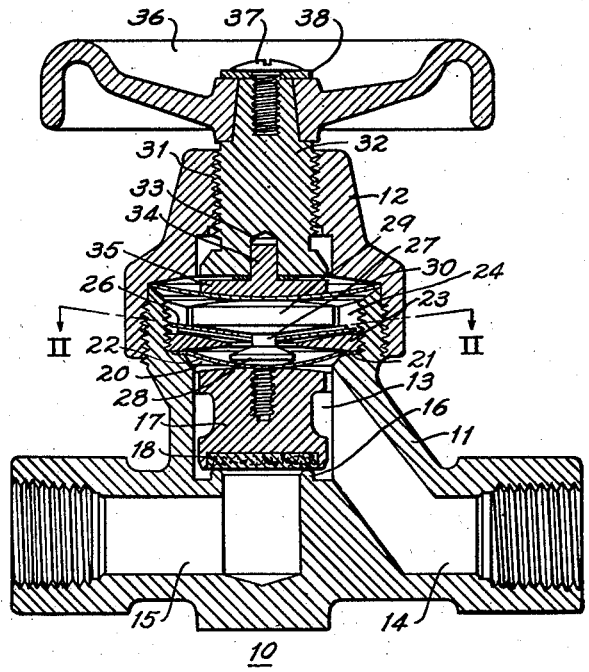
Figure 1 is a view, partly in section and partly in side elevation, of a valve constructed in accordance with the teachings of the invention.

Referring now to the drawings, and Fig. 1 in particular, a valve casing is shown generally at 10. The casing comprises a main body portion 11 and a bonnet 12. Both portions of the casing may be made in the usual manner, that is, by casting or forging. It is common practice after the rough casting has been made to machine and tap the parts to provide the necessary bores and threads that are required in assembling and mounting the valve structure. Since these operations are so well known in the manufacture of valves, it will not be necessary to describe them in detail herein.

The lower portion of the valve casing is provided with a valve chamber 13 which has openings 14 and 15 leading therefrom to provide a passageway through the casing. As illustrated, a valve seat 16 is formed integral with the lower portion 11 of the casing and is disposed centrally thereof. The upper portion of the valve chamber is defined by a cylindrical wall, and in this portion of the casing the valve head 17 is movably mounted in alignment with the valve seat 16.

Figure 5:
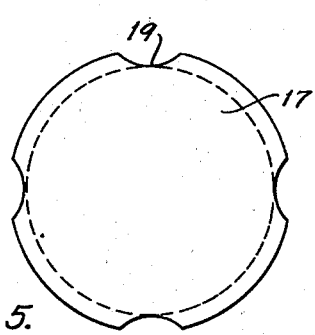
Fig. 5 is a view in top elevation of the valve head employed in the valve structure.

The valve head may be of any well known type and provided with a composition face 18 to improve the seating on the valve seat 16 to give a tight closure. Composition materials employed for this purpose are well known in the art and need not be described herein. As shown in Fig. 5, the valve head is provided with a plurality of vertical grooves 19 for permitting the flow of fluid under pressure upwardly past the valve head.

In the embodiment of the invention illustrated in Fig. 1, the cylindrical wall surrounding the valve head flares outwardly at 20 and terminates in a shelf-like portion or shoulder 21. A perforated diaphragm 22 is disposed in the casing with its periphery or outer portion seated on the shoulder of the casing 21. This diaphragm may be of any well known laminated type and will be selected for the duties it will have to perform. Since diaphragms of this kind have been long known in the art, a description of the details of its construction are deemed unnecessary.

As shown in the drawings in the preferred embodiment, only one perforation or opening is made in the diaphragm 22 and such perforation is provided to permit the clamping or connecting of the central portion of the diaphragm to the valve head. When the diaphragm is connected or clamped to the valve head as illustrated, it is sealed and gives the same effect that is obtained by using an unperforated diaphragm yet permits a positive connection between the valve head and biasing springs.

Figure 3:
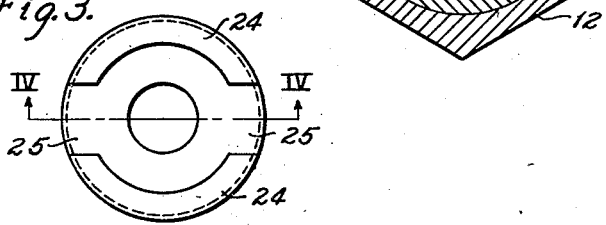
Fig. 3 is a top elevation of an annular member utilized in the holding of members in place in the valve structure.
Figure 4:
Fig. 4 is a view in cross section along the line IV—IV of Fig. 3.

The outer part of the diaphragm is clamped in engagement with the shelf portion 21 mounted in the casing by an annular member 23, the outer portion of which is threaded and makes threaded engagement with a thread provided in the inner wall of the portion of the casing 11. As shown, the annular member 23 is beveled for a purpose to be described hereinafter. The annular member 23 also has upwardly extending semi-circular projections 24, the outer portions of which are threaded to also engage in the thread provided in the inner wall of the upper portion of the casing 11. As best shown in Fig. 3, these semicircular members 24 provide gaps 25 into which a specially designed wrench may be fitted for screwing it into the casing to make tight engagement with the outer portion of the diaphragm 22. The gaps 25 also serve the purpose of holding spring members 26.

The spring members 26 employed in this particular embodiment of the invention are two fork-shaped members made from spring steel and of a size and shape to fit into the gaps 25. As shown, the fork-shaped springs 26 are oppositely disposed to one another with the forked ends fitting around a stem 27. The thickness of the plate used for making the springs will depend on the duties to be performed and will be a matter of design.

The stem 27 is a part of what might be described as a two-headed screw utilized for two functions. The head 28, which is somewhat oval in shape, is utilized for connecting the central portion of the perforated diaphragm 22 to the valve head 17. As shown, the threaded portion of the screw provided on the head 28 engages in a thread cut in a bore provided centrally in the valve head 17. The upper and larger head 29 which is connected to the stem 27 and is also somewhat oval in shape seats on the springs 26 and provides a connection between them and the valve head 17. The upper surface of the head 29 is curved to engage a diaphragm 30.

It will be observed that the head 28 is of such a diameter that it will just move nicely through the opening in the annular member 23, while the head 29 fits into the space provided between the upwardly extending projections 24. The head 28, which is designed to pass into or through the opening in the annular member 23, together with the latter, provides a support for the perforated diaphragm 22.

The provision of the two diaphragms 22 and 30 results in a sealed chamber into which the fluids do not penetrate. Therefore the springs and other parts housed in this sealed chamber are protected from corrosion by the fluids.

The diaphragm 30 is not perforated and is of a construction commonly provided in diaphragm valves. Diaphragms such as 30 are well known in the art and need not be described herein. It will preferably be laminated, probably using layers of bronze and stainless steel alternately. The diaphragm 30 makes engagement with the casing 11, the outer portion being disposed between the lower casing portion of the casing 11 and the bonnet 12. In this particular construction, the actuating means for the valve is mounted in the bonnet 12.

As shown, the bonnet is provided with a threaded opening 31 in which a valve stem 32 makes threaded engagement. The lower end of the valve stem has a bore 33 therein for receiving the stem 34 provided on a head 35. The lower face of the head is so curved as to seat properly against the diaphragm 30.

On the upper end of the element 32 an actuating handwheel 36 is mounted by means of a screw 37 and washer 38. The portion of the valve element which fits into the handwheel will be made square or hexagonal so that the handwheel will not turn thereon.

In the operation of the valve, assume that it stands in its closed position as shown in Fig. 1 and that fluid under pressure enters through the opening 14. Since pressure is transmitted evenly in all directions in a fluid, there will be pressures exerted downwardly on certain of the exposed faces of the valve head. If the pressure is great enough, it will be practically impossible to make the springs 26 strong enough to actuate the valve head upwardly against this pressure in case the valve stem 32 is actuated upwardly by turning the handwheel 36.

In the present construction, in order to effect the operation of the valve under all pressure conditions, the casing is so designed as to expose a greater area of the surface of the perforated diaphragm next to the valve head 17 than the area of the valve head exposed to fluid pressures which act downwardly. In this manner, a portion of the fluid pressure acting on the diaphragm 22 is cumulative with the biasing force of the springs 26 and acts to project the head 17 upwardly when released by operating the handwheel 36. In other words, there is provided a hermetically sealed valve having biasing forces resulting from the pressure of the fluids admitted to the valve acting in the same direction as the springs 26. It will be readily appreciated that in designing the valve the area of the diaphragm 22 can be made great enough to assure the raising of the valve head under any pressure condition.

In designing the annular member 23 and the head 28, they are so shaped that, when the head 28 stands in the opening of the annular member 23, they provide an almost continuous support for the diaphragm 22. Further, in locating the member 23 in the valve casing 10, it is so disposed that when the valve stem reaches the limit of its upward movement the head 28 will stand in the opening in the annular member 23.

Figure 2:
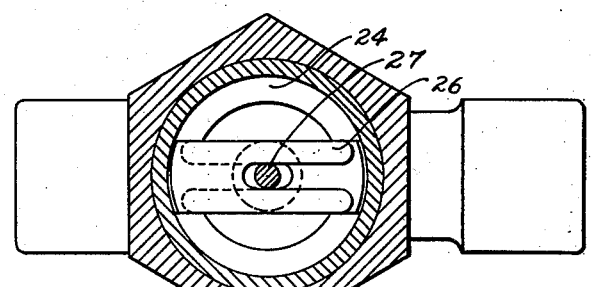
Fig. 2 is a view in cross section taken along the line II—II of Fig. 1.

It will be observed that the bonnet section 12 is made hexagonal as best shown in Fig. 2 to facilitate its removal by means of a wrench. In this structure the bonnet may be removed to replace the diaphragm 30. When the bonnet is removed the valve head 17 moves up and presses the diaphragm 22 against the annular member 23 and thus prevents the escape of the fluids in the line or cylinder as the case may be.

It will be readily understood that the novel features of this valve may as readily be applied to a cylinder valve as to a line valve. The elements disclosed and described cooperate to utilize the pressures of the fluids cumulatively with the springs to effect a raising of the valve head to open it under all pressure conditions.

Figure 6:
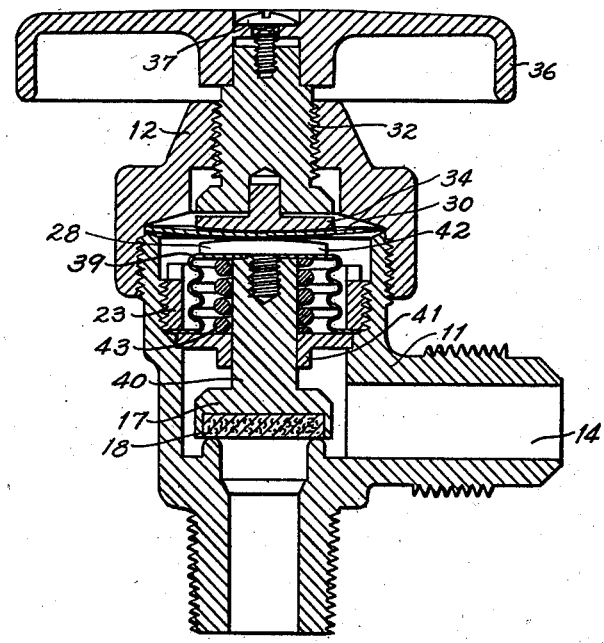
Fig. 6 is a view, partly in section and partly in side elevation, of a modification of the valve shown in Fig. 1.

In the modification illustrated in Fig. 6, the perforated diaphragm is in the form of a bellows 39. The well known Sylphon bellows may be employed. In this case the member 39 is the equivalent of the perforated diaphragm. In this modification of the invention, the valve head 17 is provided with an upwardly extending cylindrical portion 40 which slides in a guide 41 mounted in the casing portion 11 and held in position by the annular member 23, which, in this instance, is of a somewhat different shape. The central portion of the diaphragm or Sylphon bellows 39 is connected to the cylindrical member 40 provided on the head 17 by means of a screw 42 provided with a large head simulating the head 29 of Fig. 1. The annular member 23 clamps the lower portion of the Sylphon bellows 39 to the casing in a manner previously described. The bonnet 12 and the valve actuating mechanism is the same as provided in Fig. 1 except that it may be somewhat different in shape. Of course, the lower portion 11 of the casing is different in shape from the structure illustrated in Fig. 1, since the valve is designed for use as a cylinder valve.

The biasing spring 43 is a coil spring disposed between the guide 41 and the Sylphon bellows. Actually the biasing pressure exerted by the spring is against the screw 42 which makes threaded engagement with a threaded opening provided in the cylindrical member 40.

The surface area of the Sylphon bellows exposed to the fluids under pressure and next the valve head is greater in area than the upper surface of the valve head exposed to pressures which tend to hold the valve head in closed position. Therefore in the operation of the valve when fluids under pressure are admitted through the opening 14, a pressure acting upwardly on the diaphragm or Sylphon bellows 39 will be greater than that acting downwardly on the valve head 17. The valve can be so designed that the pressure acting upon the diaphragm in conjunction with the biasing force of the spring 43 will overcome the pressure conditions to be met and the valve will respond to the operation of the handwheel.

Figure 7:
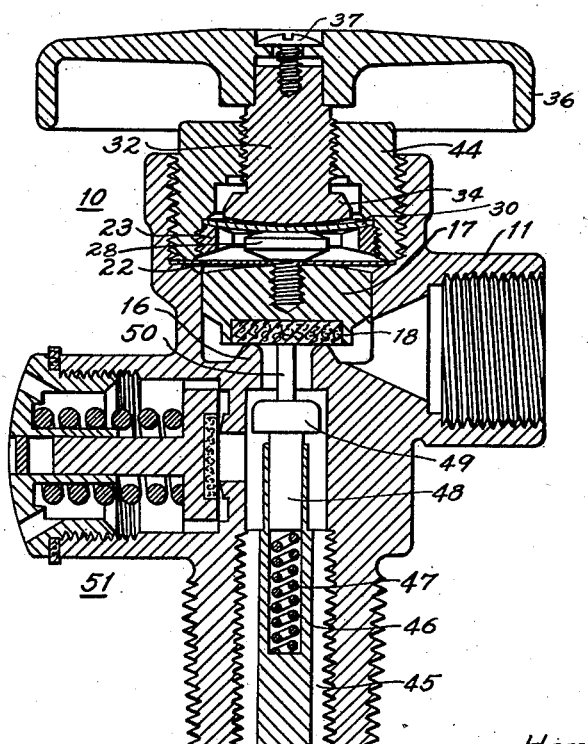
Fig. 7 is a view, partly in section and partly in side elevation, of a second modification of the valve illustrated in Fig. 1.

The modification illustrated in Fig. 7 is primarily for a cylinder. The general construction of this valve is more similar to that of Fig. 1 with the exception of the location of the spring and the provision of a back seating head. In this embodiment of the invention, the plug 44 which carries the actuating stem 32 is utilized to clamp the perforated diaphragm 22 in engagement with the lower portion 11 of the casing 10. The annular member 23 is mounted in the threaded opening provided in the plug 44.

In addition, the lower portion of the valve casing is provided with an internal thread in which a spider 45 carrying a cylinder 46 closed at the lower end makes threaded engagement. A coil spring 47 is disposed in the cylinder below a slidably mounted stem 48 carrying a back seating valve head 49. A spacer 50 is provided on the back seating valve head.

The functioning of this modification of the invention is very similar to that of the embodiment of the invention illustrated in Fig. 1. The back seating valve head 49, which is in addition to the structure illustrated in Fig. 1, is for the purpose of closing the valve to the flow of fluid under pressure from the cylinder in case it is necessary to remove the upper portion of the valve structure. The spacer 50 disposed between the valve head 17 and the back seating valve head 49 is made of such a length that when the valve head 17 stands in its most uppermost position the back seating valve head 49 will not close the passageway through the valve.

The locating of the biasing spring 47 in the lower portion of the valve enables the cutting down of the height of the upper portion of the valve. Since the biasing force of the spring is transmitted directly through rigid mechanical members, it is as effective as when mounted above the valve head as in the modification shown in Figs. 1 and 6.

Again in this modification of the invention the walls of the cylindrical portion of the casing in which the valve head 17 is mounted flare outwardly, and the area of the diaphragm 22 next to the valve head and exposed to fluids under pressure is greater than the upper surface area of the valve head 17 which is exposed to fluid pressure. Therefore, there is a fluid pressure acting on the diaphragm 22 and in the same direction as the biasing force of the spring 47 which, when the valve is properly designed, will open it under all pressure conditions.

The structure illustrated generally at 51 is a safety device provided on the valve. These safety devices are well known in the art and need not be described herein. It has been shown primarily in order to disclose that the applicant is familiar with these safety devices and may apply them to valves embodying the inventive features which he has disclosed in this application.

Since various changes may be made in the above-described construction and arrangement of parts, and different embodiments may be made without departing from the scope and spirit thereof, it is intended that all matter contained in the above description or shown in the accompanying drawings shall be interpreted as illustrative and not in a limiting sense.

I claim as my invention:

1. In a valve structure for controlling the flow of fluids, in combination, a valve case provided with a valve chamber and having a plurality of openings leading from the valve chamber to provide a passageway through the valve casing, a valve seat disposed in the valve chamber, a valve head movably disposed in the valve casing in alignment with the valve seat, a spring disposed to bias the valve head upwardly away from the valve seat, a perforated diaphragm, the edge of the diaphragm defining the perforation being clamped to the valve head, means for establishing engagement between the periphery of the perforated diaphragm and the valve casing, the perforated diaphragm presenting a surface area next to the valve head and exposed to the pressure of fluids in the valve when it is closed to cooperate with the spring in actuating the valve head upwardly, means for actuating the valve head downwardly and an unperforated diaphragm disposed in the casing between the actuating means and the valve head to provide a sealed chamber between the diaphragms.

2. In a valve structure for controlling the flow of fluids, in combination, a valve casing provided with a valve chamber and having a plurality of openings leading from the valve chamber to provide a passageway through the valve casing, a valve seat disposed in the valve chamber, a valve head movably mounted in the valve casing in alignment with the valve seat, a spring disposed to bias the valve head upwardly away from the valve seat, a metallic diaphragm disposed in the valve casing, the metallic diaphragm having a perforation therein, means for connecting the edge of the diaphragm defining the perforation to the valve head whereby the connected portion of the diaphragm moves with the valve head, means for clamping the periphery of the diaphragm against the valve casing, the diaphragm presenting a surface area next to the valve head greater than the upper surface area of the valve head, the diaphragm thereby cooperating with the spring to bias the valve head upwardly when the diaphragm is subjected to fluid pressure, means for actuating the valve head downwardly and an unperforated diaphragm disposed in the casing between the actuating means and the valve head as a protective means in case of failure of the perforated diaphragm.

3. In a valve structure for controlling the flow of fluids, in combination, a valve casing provided with a valve chamber and having a plurality of openings leading from the valve chamber to provide a passageway through the valve casing, a valve seat disposed in the valve chamber, a valve head movably mounted in the valve casing in alignment with the valve seat to close the passageway through the casing, a diaphragm disposed above the valve head, the diaphragm having an opening extending therethrough, means for establishing engagement between the periphery of the diaphragm and the valve casing, the edge of the diaphragm defining the opening being connected to the valve head thereby sealing the opening, the diaphragm presenting a surface area next to the valve head and exposed to fluid pressures in the valve which is greater than the exposed upper surface area of the valve head, the diaphragm thereby cooperating to raise the valve head when subjected to fluid pressures, means for actuating the valve head downwardly and an unperforated diaphragm disposed between the valve head and the valve actuating means to provide a sealed chamber between the diaphragms.

4. In a valve structure for controlling the flow of fluids, in combination, a valve casing provided with a valve chamber and having a plurality of openings leading from the valve chamber to provide a passageway leading through the valve casing, a valve seat disposed in the valve chamber, a valve head movably disposed in the valve casing in alignment with the valve seat, a perforated diaphragm disposed in the valve casing, means for clamping the edge of the diaphragm defining the perforation to the valve head to seal it, an annular member for establishing engagement between the periphery of the perforated diaphragm and the casing, spring means disposed in the valve casing for biasing the valve head upwardly, means for actuating the valve head downwardly, the perforated diaphragm connected to the valve head presenting a surface next to the valve head which is greater in area than the surface of the valve head exposed to fluid pressures acting downwardly thereby to cooperate in actuating the valve head upwardly, and an unperforated diaphragm disposed between the actuating means and the valve head to provide a sealed chamber between the two diaphragms.

5. In a valve structure for controlling the flow of fluids, in combination, a valve casing provided with a valve chamber, the valve casing having a plurality of openings leading from the valve chamber to provide a passageway, a valve seat disposed in the valve chamber, a valve head movably mounted in the valve chamber in alignment with the valve seat, a diaphragm disposed in the valve casing above the valve head, an annular member making threaded engagement with the valve casing for holding the periphery of the perforated diaphragm in engagement with the valve casing, the diaphragm having an opening therethrough located substantially centrally thereof, means for clamping the edge defining the opening to the valve head to seal the diaphragm, the diaphragm presenting a larger surface area next to the valve head than the area of the valve head that is exposed to fluid pressure that may be built up in the casing to force the valve head downwardly whereby the diaphragm, when subjected to fluid pressure, cooperates in biasing the valve head upwardly, a spring disposed in the valve casing and connected to the valve head to bias the valve head upwardly, means for actuating the valve head downwardly against the biasing action of the spring and an unperforated diaphragm disposed in the valve casing between the actuating means and the valve head, the two diaphragms providing a sealed chamber.

6. In a valve structure for controlling the flow of fluids, in combination, a valve casing provided with a valve chamber, the casing having a plurality of openings leading from the valve chamber to provide a passageway through the valve casing, a valve seat disposed in the valve chamber, a valve head movably mounted in the valve chamber in alignment with the valve seat, a perforated diaphragm disposed in the valve casing above the valve head, an annular member making threaded engagement with the valve casing for clamping the periphery of the perforated diaphragm in engagement with the valve casing, means extending through the perforation of the diaphragm for clamping the central portion of the diaphragm to the valve head to seal it, spring members above the annular member and engaging the valve head, the spring members being disposed to bias the valve head upwardly while it stands in its closed position, means for actuating the valve head downwardly to its closed position, and a diaphragm disposed between the actuating means and the valve head, the diaphragm making engagement with the casing and cooperating with the perforated diaphragm to provide a sealed chamber.

7. In a valve structure for controlling the flow of fluids, in combination, a valve casing provided with a valve chamber and having a plurality of openings leading from the valve chamber to provide a passageway through the valve casing, a valve seat disposed in the valve chamber, a valve head movably mounted in the valve chamber in alignment with the valve seat, a perforated diaphragm disposed in the valve chamber above the valve head, means for clamping the outer portion of the diaphragm in engagement with the valve casing, means extending through the perforation in the diaphragm for connecting the central portion of the diaphragm to the valve head and sealing it, the diaphragm presenting a larger surface area next to the valve head exposed to fluid pressures acting upwardly than the surface areas of the valve head exposed to fluid pressures acting downwardly to cooperate in moving the valve head upwardly when exposed to the fluid pressures, springs disposed in the valve casing, a member connected to the valve head and engaged by the spring members whereby when the valve stands in its closed position the spring members exert a biasing force upwardly, means for actuating the valve head to its closed position, and a diaphragm in engagement with the valve casing disposed between the actuating means and the valve head, the two diaphragms providing a sealed chamber.

8. In a valve structure for controlling the flow of fluids, in combination, a valve casing provided with a valve chamber and having a plurality of openings leading from the valve chamber to provide a passageway through the valve casing, a valve seat integral with the valve casing and in the valve chamber, a valve head movably mounted in the valve chamber in alignment with the valve seat, a perforated diaphragm in the form of a bellows disposed in the valve chamber, means for clamping the outer edge of the diaphragm to the valve casing, means extending through the perforation of the diaphragm for connecting the central portion of the diaphragm to the valve head to seal it, a spring disposed for biasing the valve head upwardly, means for actuating the valve head downwardly into engagement with the seat; and an unperforated diaphragm disposed between the actuating means and the valve head to cooperate in providing a sealed chamber, the outer periphery of the unperforated diaphragm being in engagement with the valve casing.

9. In a valve structure for controlling the flow of fluids, in combination, a valve casing provided with a valve chamber, the casing having a plurality of openings leading from the valve chamber to provide a passageway, a valve seat formed integral with the casing and disposed in the valve chamber, a valve head movably mounted in the chamber in alignment with the valve seat, a perforated diaphragm disposed above the valve head, means extending through the perforation connecting the central portion of the diaphragm to the valve head to seal it, means for pressing the periphery of the perforated diaphragm into engagement with the valve casing, the perforated diaphragm presenting a larger surface exposed to fluid pressures acting upwardly than the surface area of the valve head disposed in fluid pressures acting downwardly when fluids are admitted to the valve, means for actuating the valve head downwardly, and an unperforated diaphragm disposed between the actuating means and the valve head, the periphery of the unperforated diaphragm being clamped in engagement with the valve casing the two diaphragms providing a sealed chamber, a back seating valve head movably mounted in the valve casing and disposed below the valve seat and in alignment with the valve seat to engage it when it moves upwardly, means for biasing the back seating valve head upwardly, and a spacer disposed between the back seating valve head and the other valve head whereby when the main valve head stands in the open position the back seating valve head will be spaced from the valve seat.

10. In a valve structure for controlling the flow of fluids under pressure, in combination, a valve casing, a valve head movably mounted in the casing, a diaphragm having an opening therethrough disposed with its outer periphery in tight engagement with the casing, means extending through the opening for clamping the diaphragm to the valve head to seal it, a spring located above the diaphragm and positively connected to the valve head for biasing it in a predetermined direction, and an unperforated diaphragm disposed above the valve head, the outer periphery of the unperforated diaphragm being in tight engagement with the casing thereby cooperating with the other diaphragm to provide a sealed chamber in which the spring is mounted.

HARRY H. LAMAR.